Feb. 15, 1966    I. S. LERNER ET AL    3,234,593
SEALING MEANS FOR TUBES
Filed June 15, 1964

INVENTORS
IRWIN S. LERNER
KURT J. SUNDHEIMER
BY Philip D. Hilbert
ATTORNEY.

United States Patent Office 3,234,593
Patented Feb. 15, 1966

3,234,593
SEALING MEANS FOR TUBES
Irwin S. Lerner, Greenwich, Conn., and Kurt J. Sundheimer, New Hyde Park, N.Y., assignors to Clay-Adams, Inc., New York, N.Y., a corporation of New York
Filed June 15, 1964, Ser. No. 375,121
8 Claims. (Cl. 18—1)

This invention relates to the sealing of the ends of tubes, and more particularly concerns the sealing of the ends of small bore tubes such as capillary tubes or the like, with suitable sealant materials.

It is known to seal the open ends of tubes, such as capillary tubes, with plugs of clay or other suitable sealant materials. This is accomplished by providing the clay or other sealant material as a layer of substantially uniform thickness which is approximately equal to the length of the plug desired. The layer of sealant material is supported in a flat bottom tray formed of metal, plastic or the like. The tube to be sealed is held in a position which is approximately at right angles to the plane of the tray carrying the sealant layer and the open end of the tube is pushed into the sealant layer until the tube end makes contact with the wall of the tray. When the tube is withdrawn, a plug of clay or other sealant, will be deposited in the lower end of the tube; said plug forming the seal for the tube.

However, it has been found that the above described sealing procedure gives rise to a substantial proportion of incomplete seals which adversely affect subsequent manipulation of the sealed tubes and their contents such as blood specimens and the like. This is particularly evident when subjecting the sealed tubes to centrifuging operations.

Incomplete seals in tubes usually occur when the tube is slightly tilted to the perpendicular when the same is inserted into the sealant material carried by the tray; or, if the tube is irregular about the circumferential end thereof, such end not being entirely in a common plane extending at right angles to the axis of the tube. In either case, the tube end will not make complete circumferential contact with the bottom wall of the tray as the tube is pressed into the layer of sealant material carried by the tray. As a result, the plug portion of sealant material within the tube end is incompletely sheared away from the main body of sealant material and such plug portion remains connected with the main body of sealant material, so that upon withdrawal of the tube, portions or all of the plug will tend to separate from the lower end of the withdrawn tube and will remain with the main body of sealant material.

Recently, the clay or other sealant materials used for sealing capillary tubes, has been provided in very soft forms which can produce better seals. However, the softer sealants have a greater tendency to shear in an incomplete manner, as described above, producing incomplete plugs in the sealing operation.

Accordingly, an object of this invention is to provide improved sealant means applicable to the ends of capillary tubes or the like, wherein the deposited plug of sealant material is always completely sheared away from the main body of sealant, despite possible tilt of the tube as it is inserted into the sealant or circumferential irregularities in the tube end.

Another object of this invention is to provide an improved combination of a tray and layer of tube sealant carried by the tray, together with a soft resilient layer of material between the bottom wall of the tray and the layer of tube sealant, whereby insertion of a tube end into the layer of sealant will also depress that portion of the resilient layer of material immediately aligned with the tube end so as to effectively shear the plug insert portion of the sealant completely from the main body of sealant.

A further object of this invention is to provide in a tray of sealant material for tube ends, a thin layer of soft foam material having a thickness which may be a fraction of the thickness of the layer of sealant material, yet is effective to insure a completely sheared plug when a tube end is inserted into the sealant layer and pressed downwardly so as to indent the layer of foam material which lies between the bottom wall of the tray and the layer of sealant material; although the inserted tube may be tilted with respect to the vertical or may have an irregular rim at the tube end.

Other objects of this invention will in part be obvious and in part hereinafter pointed out.

Conventionally, sealant materials for plugging the ends of capillary tubes and the like, are of modified kaolin compositions and have the property of adhering to the glass surface so as to tightly seal the tube ends and to maintain such seals under extreme conditions such as centrifuging and the like.

Figure 1:
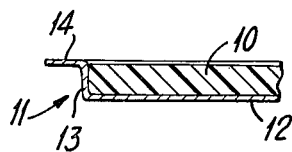
FIG. 1 is a partial sectional view in elevation, showing a conventional sealant carrying tray used in sealing tube ends.

As shown in FIG. 1, sealant clay 10 is carried as a layer of substantially uniform thickness, of the order of about ⅛" in a thin walled tray 11 of plastic or other suitable material. The sealant layer 10 is in direct contact with the bottom wall 12 of tray 11 and extends to the side walls 13 thereof. The rim 14 of tray 11 provides means for applying spaced identifying indicia thereto for identifying the individual tubes 15 which are to be sealed.

Figure 2:
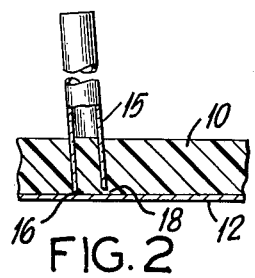
FIG. 2 is an enlarged sectional view showing a tube end being sealed using the sealant carrying tray of FIG. 1.

Thus, as shown in FIG. 2, a tube 15 is held in a substantially vertical position over the sealant layer 10 carried in tray 11 and its lower end 16 is inserted into layer 10 and pressed against tray wall 12. This action is effective to form a plug 17 of sealant material within the lower end of tube 15 and upon lifting tube 15 away from tray 11, the plug 17 is separated or sheared away from the main body of sealant layer 10.

Figure 3:
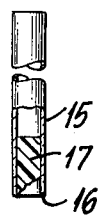
FIG. 3 is an enlarged sectional view showing a tube sealed in the means shown in FIGS. 1, 2; and having an incomplete plug seal.

However, if tube 15 is not held in a true vertical position when the end 16 thereof is inserted into sealant layer 10; or if the tube end 16 is irregular about its circumferential extent, then the plug 17 may be incompletely separated or sheared from the main body of sealant layer 10. Thus, as indicated in FIG. 2, a connection between plug 17 and layer 10 will be maintained as at 18 where a circumferential portion of tube end 16 does not make contact with the bottom wall 12 of tray 11. When tube 15 is lifted away from the sealant layer 10, it has been found that varying proportions of plug 17 tend to stay with the main body of sealant layer 10, leaving the plug 17 within tube 15, incomplete, as shown in FIG. 3.

Accordingly, the instant invention, as illustrated in FIGS. 4-8, provides sealant means for capillary tubes and the like, wherein the sealant plug within the tube end is complete even though the tube when inserted into the sealant layer may have been slightly tilted with respect to the vertical or the tube end may have been irregular about its circumferential extent.

Figure 4:
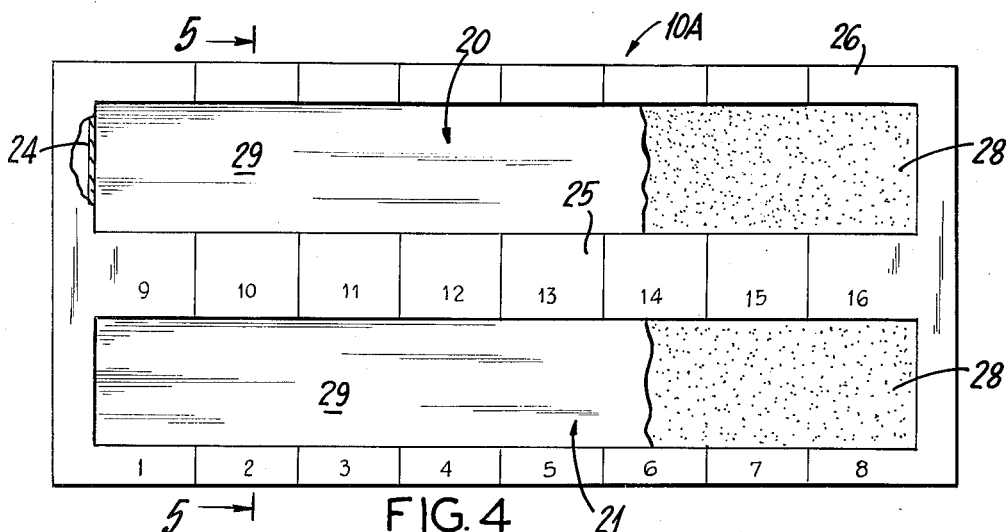
FIG. 4 is a plan view of a sealant carrying tray embodying the invention, with parts cut away.
Figure 5:
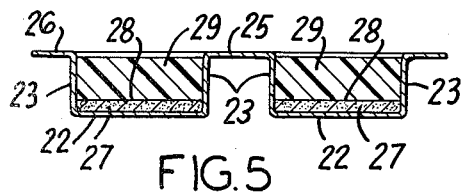
FIG. 5 is a sectional view taken on the line 5—5 of FIG. 4.

As shown in FIGS. 4, 5, the tray 10A may be formed of molded plastic or other suitable material and may be in a form to provide two elongated compartments 20, 21. Each compartment is defined by a flat bottom wall 22, side walls 23 and end walls 24. The compartments 20, 21 are separated by a longitudinally extending web 25 and have peripheral flanged rim portions 26.

The bottom wall 22 of each of the compartments 20, 21 is covered with a thin layer 27 of soft, resilient foam material such as polyurethane or the like. Alternatively the layer 27 may be of soft rubber. In either case, layer 27 has a smooth, imperforate upper surface 28. The sealant material 29 of modified koalin or the like is disposed over layer 27. The sealant layer 29 may have the usual thickness of the order of about 1/8" while the underlying resilient layer 27 may have a thickness of the order of about 1/32".

Figure 6:
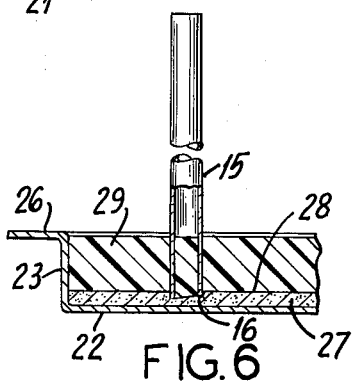
FIG. 6 is an enlarged sectional view showing a tube inserted into the sealant of the tray shown in FIGS. 4, 5.
Figure 7:
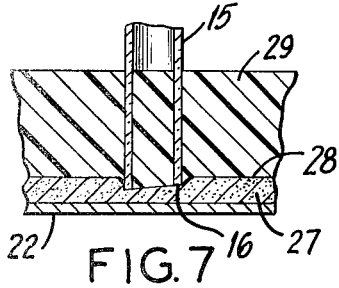
FIG. 7 is an enlarged sectional view showing the complete shearing of the sealant plug within the tube, from the main body of sealant.

It will be apparent from a consideration of FIGS. 6, 7, that when a tube 15 has its end 16 inserted into sealant layer 29, the tube end 16 will indent the resilient layer 27 since layer 27 will yield to the downward pressure applied to tube 15, thereby completely shearing the sealant plug 17A from the main body of sealant layer 29. Thus, the yieldable layer 27 is effective to accommodate the tube end 16 whether the same is tilted from the vertical or is irregular about its circumferential extent.

Figure 8:
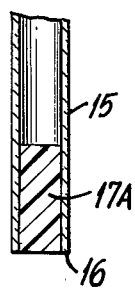
FIG. 8 is a partial, enlarged sectional view showing a tube with a complete plug seal in the end thereof, in accordance with the invention.

It has been found that with the sealant tray of the instant invention, very soft clays, such as those compounded with petrolatum and other modifying ingredients, all in a manner known in the art; are effective to form complete plug seals 17A, as shown in FIG. 8. Such soft clay seals are highly effective even under extreme conditions of centrifuging and the like, providing the seals are not fragmented in the plugging operation, and extent completely about the tube end 16, as shown in FIG. 8.

It is understood that the combination of sealant material and an underlying resilient layer may be used in sealing tubes of varying bore diameters when such tubes are sealed by inserting the ends thereof into the sealant layer and then withdrawing the tubes with a plug insert.

Since tubes 15 may be left inserted in the sealant material carried by tray 10A, the web 25 and rim portions 26 may be marked with numbers or other indicia at intervals to identify the inserted, upstanding tubes located opposite the respective indicia.

Figure 9:
FIG. 9 is a partial sectional view showing a modified form of the invention.

As an alternative to using a separate layer of resilient material between the bottom wall of a tray and the sealant material; the tray may be made of a material which will provide resiliency in the bottom wall thereof. Thus, as shown in FIG. 9, tray 30 is formed of a synthetic plastice or rubber material which provides a bottom wall 31 having sufficient resiliency to allow the tube end passing through sealant material 29 disposed directly over bottom wall 31 to indent such bottom wall and to thus form a proper plug seal within the tube end, as previously described. It is understood that the rubber or plastic used in making tray 30 will maintain the tray shape while still having sufficient resilience to allow indentation of the bottom wall 31 thereof. Thus the tray 30 may be formed of a semi-hard rubber, modified polystyrene, polypropylene, polyethylene or the like.

As various changes might be made in the embodiment of the invention herein disclosed, without departing from the spirit thereof, it is understood that all matter herein shown or described shall be deemed illustrative and not by way of limitation, except as set forth in the appended claims.

What is claimed is:

1. Sealing means for the open ends of tubes comprising a container having a flat bottom wall, a layer of resilient material overlying the bottom wall of said container, and a layer of soft, pliable plastic sealant material overlying the layer of resilient material, said plastic layer being adapted to be penetrated by one end of a tube to be sealed, said tube end extending to the interface of said plastic and resilient layers and indenting the resilient layer for separating and receiving therein a plug of sealant material.

2. Sealing means as in claim 1 wherein said resilient material is a synthetic foam having an imperforate surface, and said sealant material is clay.

3. Sealing means for the open ends of capillary tubes comprising a flat surfaced supporting member, a flat layer of soft, pliable plastic sealant over said supporting member, and a layer of soft, resilient material having one surface thereof in contact with a surface of said supporting member and the other surface thereof in contact with the undersurface of said layer of plastic sealant, said sealant layer being adapted to be penetrated by one end of a tube to be sealed, said one end of the tube extending to and indenting said resilient layer to separate and receive therein a plug portion of sealant from said layer of sealant.

4. In combination with a tray having a flat bottom wall, a sheet of soft, resilient foam material overlying said bottom wall and supported thereby and a layer of soft, pliable plastic sealant overlying said sheet of foam material and supported thereby, said sheet of foam material having a smooth surface portion in contact with said layer of plastic sealant, said sealant layer being adapted to be penetrated by one end of a tube to be sealed, said one end of the tube extending to and indenting said resilient layer to separate and receive therein a plug portion of sealant from said layer of sealant.

5. In combination, a tray, a layer of soft, deformable tube sealant material within said tray and a layer of resilient material underlying and in contact with the layer of sealant material, said layer of resilient material being adapted to be indented by the end of a tube upon insertion of said tube into said layer of sealant material, said tube end extending to and indenting said layer of resilient material.

6. The combination as in claim 5 wherein said layer of resilient material forms the bottom wall of said tray.

7. The combination as in claim 5 wherein said layer of resilient material is supported on the bottom wall of said tray.

8. In combination, a tray comprising a bottom wall formed of resilient material, a layer of soft, deformable tube sealant material of clay supported by the bottom wall of the tray, said layer of sealant material being adapted to be penetrated by the end of a tube inserted into said layer of material, said tube end being adapted to indent the upper surface of the bottom wall of the tray, whereby a plug of sealant material is deposited in said tube end and said plug of sealant material is sheared away from said layer of sealant material when said tube end is withdrawn therefrom.

References Cited by the Examiner
UNITED STATES PATENTS

| | | | |
|---|---|---|---|
| 579,537 | 3/1897 | Harmon | 83—658 |
| 2,281,877 | 5/1942 | Green | 83—658 |
| 2,292,024 | 8/1942 | Dreher | |
| 2,971,637 | 2/1961 | Simons | 206—17 |

WILLIAM J. STEPHENSON, *Primary Examiner.*